(12) United States Patent
Hwang et al.

(10) Patent No.: US 10,647,824 B2
(45) Date of Patent: May 12, 2020

(54) THERMOPLASTIC ELASTOMER RESIN POWDER AND METHOD FOR PRODUCING THERMOPLASTIC ELASTOMER RESIN POWDER

(71) Applicant: LG Hausys, Ltd., Seoul (KR)

(72) Inventors: Deok-Ryul Hwang, Seoul (KR); Sung-Yong Kang, Anyang-si (KR); Jun-Beom Shin, Suwon-si (KR); Kyoung-Min Kang, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 276 days.

(21) Appl. No.: 15/516,009

(22) PCT Filed: Sep. 24, 2015

(86) PCT No.: PCT/KR2015/010127
§ 371 (c)(1),
(2) Date: Mar. 30, 2017

(87) PCT Pub. No.: WO2016/052935
PCT Pub. Date: Apr. 7, 2016

(65) Prior Publication Data
US 2017/0291996 A1    Oct. 12, 2017

(30) Foreign Application Priority Data

Sep. 30, 2014 (KR) .................. 10-2014-0130881

(51) Int. Cl.
| | | |
|---|---|---|
| C08J 3/12 | (2006.01) | |
| C08L 101/00 | (2006.01) | |
| B29C 41/18 | (2006.01) | |
| C08J 3/205 | (2006.01) | |
| B01J 2/02 | (2006.01) | |
| B29C 41/08 | (2006.01) | |
| B29K 105/00 | (2006.01) | |

(52) U.S. Cl.
CPC ............... *C08J 3/12* (2013.01); *B29C 41/18* (2013.01); *C08J 3/122* (2013.01); *C08J 3/205* (2013.01); *C08L 101/00* (2013.01); *B01J 2/02* (2013.01); *B29C 41/08* (2013.01); *B29K 2105/251* (2013.01); *C08J 2300/26* (2013.01)

(58) Field of Classification Search
CPC ..... C08J 3/12; C08J 3/122; C08J 3/205; C08J 2300/26; B29C 41/18; B29C 41/08; C08L 101/00; B01J 2/02; B29K 2105/251
USPC .......................................................... 526/72
See application file for complete search history.

(56) References Cited

FOREIGN PATENT DOCUMENTS

| | | | |
|---|---|---|---|
| JP | H05144791 A | | 6/1993 |
| JP | H07173366 A | * | 7/1995 |
| JP | H1192602 A | | 4/1999 |
| JP | 2000072929 A | | 3/2000 |
| JP | 2002283341 A | | 10/2002 |
| JP | 2005097480 A | | 4/2005 |
| KR | 1019970074825 A | | 12/1997 |
| KR | 10-1999-0046020 A | | 6/1999 |
| KR | 1020130124994 A | | 11/2013 |

OTHER PUBLICATIONS

Japanese Office Action dated Jan. 30, 2018, in connection with the Japanese Patent Application No. 2017-517296.
Korean Office Action dated Oct. 20, 2018, in connection with the Korean Patent Application No. 10-2014-0130881.
International Search Report for PCT/KR2015/010127 dated Jan. 5, 2016.

* cited by examiner

*Primary Examiner* — Ling Siu Choi
*Assistant Examiner* — Ronald Grinsted
(74) *Attorney, Agent, or Firm* — Hauptman Ham, LLP (57) ABSTRACT

A thermoplastic elastomer (TPE) resin powder includes spherical particles of a thermoplastic elastomer resin. The spherical particles have an average particle diameter of 50 μm to 300 μm. The thermoplastic elastomer resin powder is suitable for a powder slush molding (PSM) process, and the molded article produced therefrom has excellent surface characteristics.

14 Claims, 5 Drawing Sheets

ONE-HUNDRED TIMES MAGNIFICATION

TWO-HUNDRED TIMES MAGNIFICATION

FIFTY TIMES MAGNIFICATION

ONE-HUNDRED TIMES MAGNIFICATION

THERMOPLASTIC ELASTOMER RESIN POWDER AND METHOD FOR PRODUCING THERMOPLASTIC ELASTOMER RESIN POWDER

CROSS REFERENCE TO RELATED APPLICATION

This present application is a national stage filing under 35 U.S.C § 371 of PCT application number PCT/KR2015/010127 filed on Sep. 24, 2015 which is based upon and claims the benefit of priority to Korean Patent Application No. 10-2014-0130881 filed on Sep. 23, 2014 in the Korean Intellectual Property Office. The disclosures of the above-listed applications are hereby incorporated by reference herein in their entirety.

TECHNICAL FIELD

The present disclosure relates to a thermoplastic elastomer resin powder and a method for producing the thermoplastic elastomer resin powder.

BACKGROUND ART

A thermoplastic elastomer resin is a material that has thermoplastic nature as well as elasticity like rubber. Accordingly, it finds many applications as a replacement for various kinds of rubber parts such as a molded article including interior material for vehicles.

When fine powder is required during the forming process of the thermoplastic elastomer resin, it is typical to crush large particles by a cryogenic process to obtain fine powder.

DISCLOSURE

Technical Problem

It is an object of the present disclosure to provide a thermoplastic elastomer resin powder having uniform spherical particles.

It is another object of the present disclosure to provide a method for producing the thermoplastic elastomer resin powder.

Technical Solution

In accordance with one aspect of the present disclosure, a thermoplastic elastomer (TPE) resin powder includes spherical particles of a thermoplastic elastomer resin that have an average particle diameter of 50 μm to 300 μm.

The spherical particle of the thermoplastic elastomer resin in the thermoplastic elastomer resin powder may have a diameter ranging from 1 μm to 500 μm.

The thermoplastic elastomer resin may have a weight-average molecular weight from about 10,000 to about 20,000.

The thermoplastic elastomer resin powder may be used for forming in a powder slush molding process.

In accordance with one aspect of the present disclosure, a method for preparing a thermoplastic elastomer resin powder includes: preparing a molten thermoplastic elastomer resin spray liquid; and spraying the molten thermoplastic elastomer resin spray liquid by a melt spray deposition while cooling it down simultaneously, to obtain a thermoplastic elastomer resin powder having spherical particles.

In the method for producing a thermoplastic elastomer resin powder, initially, a thermoplastic elastomer resin may be introduced into an extruder equipped with an spray nozzle, and the thermoplastic elastomer resin may be transferred to the spray nozzle and heated in the spray nozzle to form the spray liquid of the molten thermoplastic elastomer resin.

The thermoplastic elastomer resin in a shape of a pellet or a pulverized particle powder may be introduced into the extruder.

Air may be injected into the spray nozzle when the molten thermoplastic elastomer resin spray liquid is introduced into the spray nozzle.

A pressure of the air injected into the spray nozzle may range from 20 to 145 psi.

A temperature of the air injected into the spray nozzle may range from 150 to 500° C.

An injection rate of the air injected into the spray nozzle may range from 10 to 70 m/s.

An additive comprising at least one selected from a group consisting of a lubricant, a plasticizer and a combination thereof may be added to the molten thermoplastic elastomer resin spray liquid.

The additive may be contained in the molten thermoplastic elastomer resin spray liquid at a content of 0.05 to 5 wt %.

A temperature of the spray nozzle may range from 150 to 500° C.

A pressure of the spray nozzle may range from 10 to 1,500 psi.

A viscosity of the molten thermoplastic elastomer resin spray liquid may range from 1,000 to 10,000 cp at 250° C.

Advantageous Effects

The thermoplastic elastomer resin powder is suitable for a powder slush molding (PSM) process, and the molded article produced therefrom has excellent surface characteristics.

BEST MODE

Hereinafter, exemplary embodiments of the present disclosure will be described in detail. However, the exemplary embodiments are merely illustrative but not limiting. It is to be noted that the scope of the present disclosure is defined solely by the claims.

In an implementation of the present disclosure, a thermoplastic elastomer (TPE) resin powder includes spherical particles of a thermoplastic elastomer resin that have an average particle diameter of approximately 50 µm to 300 µm.

A thermoplastic elastomer resin may be obtained by crosslinking a rubber with a thermoplastic resin such as polypropylene or polyethylene, and has elasticity as well as thermoplasticity.

According to the known composition methods, the thermoplastic elastomer resin can not be obtained in a powder state by extrusion or drying during the process of composition. Accordingly, it is typical that the particles obtained by the composition are further pulverized to be formed into finer powder particles. Unfortunately, it is not possible to obtain spherical particles by such pulverization.

As used herein, "spherical particles" is an expression used in contrast to particles having sharp particle surfaces formed by pulverization. It does not necessarily mean a mathematically perfectly spherical shape. It should be understood as a concept that encompasses an individual particle that may be referred to as being spherical at powder level as an aggregate of particles. Therefore, in the following description, the spherical particles should be understood as broadly encompassing the shape of the particles formed by solidification from the molten state, rather than formed by physical crushing or pulverization.

The thermoplastic elastomer resin powder can be obtained as spherical thermoplastic elastomer resin particles, and such spherical thermoplastic elastomer resin particles can be obtained by a method for producing a thermoplastic elastomer resin powder described below. The method for producing the particulate thermoplastic elastomer resin is advantageous in that the size of the thermoplastic elastomer resin particles formed by applying the melt spray deposition can be easily adjusted and that the particle size can be uniformly distributed.

By the melt spray deposition, the thermoplastic elastomer resin powder can be composed of fine spherical particles, and the particle size can be relatively uniformly distributed.

Typically, fine powders may be obtained by a cryogenic process. However, the powders thus obtained does not have spherical shape, and it is difficult to adjust the particle size. Therefore, in order to form finer particles, crushing and cooling should be carried out via several steps. As a result, there are disadvantages in that the cost is increased and the production yield is lowered. In addition, the morphology of the powder particles obtained by the cryogenic process has a sharp and irregularly crushed shape, and thus has poor flowability.

In contrast, according to the melt spray deposition, it is possible not only to produce a powder having a relatively uniform particle size distribution in a spherical shape, but also to produce it at different particle sizes, simplify the process and reduce the cost. Accordingly, the productivity can be improved. A method for producing the thermoplastic elastomer resin powder by applying the melt spray deposition will be described below in detail.

According to the method for producing the thermoplastic elastomer resin powder described below, a powder having spherical particles can be produced without using a solvent. The spherical particle powder formed by melting the thermoplastic elastomer resin in a solvent has a very small average particle diameter, say, about 50 µm or less. On the other hand, the thermoplastic elastomer resin powder has an average particle diameter of 50 µm to 300 µm. Accordingly, it can be usefully applied to applications requiring powders formed of spherical particles of this size.

The thermoplastic elastomer resin powder, which is produced by the melt spray deposition and is formed as a powder composed of fine spherical particles having a relatively uniform particle size distribution, is suitable for a powder slush molding (PSM) process, and a molded article can be formed by the powder slush molding process.

Since the thermoplastic elastomer resin has good flexibility at a low temperature, it has good low-temperature processability and has excellent heat resistance and resistance to heat aging.

Since the thermoplastic elastomer resin powder has a uniform particle size and a spherical shape, it has good in powder flowability, and a molded article having excellent molding properties can be produced by applying the powder slush molding process. Since the thermoplastic elastomer resin powder has a relatively uniform particle size and has a spherical shape, pinholes can be suppressed during molding, and therefore, superior surface characteristics can be achieved.

By employing the powder slush molding process, it is advantageous that various expressions are possible by adjusting the average size of the resin powder to be applied depending on the mold design. According to the method of producing the thermoplastic elastomer resin powder described later, the average particle diameter of the thermoplastic elastomer resin powder can be relatively easily adjusted to a desired value, while having an average size within the above-mentioned range in the shape of a sphere, allowing a variety of expressions by the powder slush molding process.

As such, since the thermoplastic elastomer resin powder is composed of fine spherical particles, it can be applied to the powder slush molding process. Accordingly, the molded article thus formed has an advantage that it can be freely designed. In addition, an embossed shape can be transferred more efficiently. Therefore, it is suitable for implementing a molded article such as an interior material for vehicles formed from the thermoplastic elastomer resin powder by the powder slush molding process. In addition, the interior material for vehicles thus produced can have higher quality by realizing excellent surface characteristics and design.

For example, by using the thermoplastic elastomer resin powder, a surface layer of an interior material for vehicles, specifically, a dashboard or a door trim can be formed via a powder slush molding process, and the surface layer has excellent surface characteristics.

The thermoplastic elastomer resin powder has an average particle diameter of about 50 µm to 300 µm, and a relatively uniform particle size distribution. Specifically, the particles may be distributed so that the diameter of the particle in the thermoplastic elastomer resin powder ranges from approximately 1 µm to 500 µm.

As long as the size of the spherical particles lies within the above-mentioned range, the particles have a relatively narrow particle size distribution in comparison with the average particle diameter in the above range, so that good powder flowability can be achieved.

The thermoplastic elastomer resin may have a weight-average molecular weight from about 10,000 to about 20,000. The thermoplastic elastomer resin having a weight-average molecular weight within the above range is excellent in heat resistance and resistance to heat aging, particularly excellent in processability due to low-temperature flexibility and excellent in transferring an embossed shape, and thus is suitable for realization of high-quality interior material for vehicles.

The thermoplastic elastomer resin powder is a spherical fine powder and thus has excellent flowability of powder, thereby lowering the angle of repose (stabilizing angle), such that the flow characteristics of the powder can be achieved. Accordingly, the apparent specific gravity of the molded article can be improved. In addition, the molded article produced from such a thermoplastic elastomer resin powder can transfer an embossed shape efficiently, and the surface quality of the product can be improved.

For example, the thermoplastic elastomer resin powder may have an angle of repose of about 40 degrees or less. Specifically, the thermoplastic elastomer resin powder has a relatively uniform particle size distribution so as to have an angle of repose of about 30 to 38 degrees. Or, it may have an angle of repose of about 25 to 30 degrees, to exhibit very good fluidity.

The apparent density of the molded article produced from the thermoplastic elastomer resin powder having good flowability may be, for example, 0.35 or more.

In another implementation of the present disclosure, a method for preparing a thermoplastic elastomer resin powder includes: preparing a molten thermoplastic elastomer resin spray liquid; and spraying the molten thermoplastic elastomer resin spray liquid by a melt spray deposition while cooling it down simultaneously, to obtain a thermoplastic elastomer resin powder having spherical particles.

The above-described thermoplastic elastomer resin powder may be produced by the method for producing the thermoplastic elastomer resin powder.

According to the method for producing the thermoplastic elastomer resin powder, the thermoplastic elastomer resin power composed of spherical particles having the above-described diameter, i.e., a fine size of about 1 μm to 500 μm can be achieved with a uniform particle size distribution relatively easily in terms of easiness of execution of the process and cost.

According to the method for producing the thermoplastic elastomer resin powder, the thermoplastic elastomer resin powder can be produced so that it has an average particle diameter within the above particle size range. By producing the power having an average particle diameter from about 50 to 300 μm, it provides a significant effect in that large spherical particles can be obtained which cannot be obtained by dissolving a thermoplastic elastomer resin in a solvent.

In the method for producing a thermoplastic elastomer resin powder, initially, a thermoplastic elastomer resin is introduced into an extruder equipped with an spray nozzle, and the thermoplastic elastomer resin is transferred to the spray nozzle and heated in the spray nozzle to form the spray liquid of the molten thermoplastic elastomer resin.

The thermoplastic elastomer resin introduced into the extruder may be in the form of pellet or powder. The thermoplastic elastomer resin can be fed into an extruder provided with a spray nozzle as a primary processed raw material of the pellet-shaped or pulverized particle powders.

Subsequently, the thermoplastic elastomer resin in the form of pellets or powder may be melted in the high-temperature spray nozzle and formed into a molten thermoplastic elastomer resin spray liquid. This molten thermoplastic elastomer resin spray liquid is sprayed in the form of high-temperature micro-droplets. At this time, since spraying is carried out in a cooling chamber, the droplets are cooled down simultaneously when they are sprayed, and micro sized spherical particles of the thermoplastic elastomer resin can be formed.

Optionally, the melt spray deposition may be performed by melt ESD (melt electrostatic spray deposition) by applying a voltage to the spray nozzle.

Air is also injected into the spray nozzle to discharge the molten thermoplastic elastomer resin spray liquid. By supplying high-temperature, high-pressure air into the spray nozzle when performing the melt spray deposition, more uniform thermoplastic elastomer resin particles can be obtained.

Further, it is possible to adjust the size and shape of the droplets of the discharged molten thermoplastic elastomer resin spray liquid by way of controlling the temperature, pressure and speed of the air injected into the spray nozzle, and accordingly, the particle size of the resulting thermoplastic elastomer resin can be adjusted.

For example, the temperature of the air injected into the spray nozzle may range from about 150 to about 500° C., and the pressure of the injected air may range from about 20 to about 145 psi (about 1.5 to about 10.0 bar). For example, by injecting air at the pressure of about 2 bar, the thermoplastic elastomer resin powder having an average particle diameter of about 60 μm can be produced by the above-mentioned method for producing the thermoplastic elastomer resin powder. For another example, by injecting air at the pressure of about 6 bar, the thermoplastic elastomer resin powder having an average particle diameter of about 10 μm can be produced by the above-mentioned method for producing the thermoplastic elastomer resin powder. Certain high temperature air tends to be inversely proportional to pressure and particle size.

In addition, for example, the injection rate of air injected into the spray nozzle may range from about 10 to 70 m/s.

In the melt spray deposition, the viscosity of the molten thermoplastic elastomer resin spray liquid can be adjusted so as to spray the thermoplastic elastomer resin into micro sized droplets.

In order to adjust the viscosity of the molten thermoplastic elastomer resin spray liquid, it is preferable to adjust the temperature of the spray nozzle, to add an additive such as a lubricant or a plasticizer together with the thermoplastic elastomer resin to the extruder so as to be compounded, or to supply a gas such as $CO_2$ into the thermoplastic elastomer resin in the form of pellets to be supplied to the extruder.

The lubricant is an additive that helps in forming spherical particles and controlling the particle size, and may include, for example, montan wax.

The additive may be included in the molten thermoplastic elastomer resin spray liquid at the content from about 0.05 to 5 wt %. By using the additive within the above range, the thermoplastic elastomer resin powder including spherical particles of thermoplastic elastomer resin having an average particle diameter of about 50 μm to 300 μm can be easily produced.

These additives may be adjusted together with the process conditions of the air to be supplied into the spray nozzle, to control the particle size and shape of the thermoplastic elastomer resin powder to be produced. For example, when the pressure of the air supplied into the spray nozzle is fixed at 2 bar and the additive is not used, a thermoplastic elastomer resin powder having the average particle diameter of about 60 μm is produced. When the pressure of the air supplied into the spray nozzle is fixed at 2 bar and montan was is used as an additive such that the molten thermoplastic elastomer resin spray liquid contains 0.4 wt % of the montan wax, the thermoplastic elastomer resin powder having the average particle diameter of about 100 μm is produced.

It is to be understood that the size of the produced particles may be varied by controlling the other process conditions.

Specifically, the shape of the spray nozzle may be adjusted. For example, nozzles with annular shapes as well as dot nozzles may be used. The area of the nozzle may be, but is not limited to, about $2.3\ e^{-6}\ m^2$ to $1.5\ e^{-4}\ m^2$.

Specifically, the viscosity of the molten thermoplastic elastomer resin spray liquid may range from about 1,000 to about 10,000 cp at about 250° C. A coating liquid may be formed as the viscosity within the above range to form a microparticulate thermoplastic elastomer resin.

The process conditions of the melt spray deposition are not particularly limited, and may be performed under known process conditions, for example, a pressure of the spray nozzle of about 100 psi to 1,500 psi.

However, the melt spray deposition should be performed in a temperature range in which the thermoplastic elastomer resin is melted. For example, the temperature of the spray nozzle may range from about 150° C. to 500 ° C.

Hereinafter, Examples and Comparative Examples will be described. The embodiments to be described below are merely illustrative but are not limiting.

EXAMPLES

Example 1

A thermoplastic elastomer resin powder having the average particle diameter of 60 μm was produced by melt ESD using thermoplastic elastomer resin pellets. In the molt ESD, 250° C. air was supplied into an spray nozzle at the rate of 13.5 m/s at the pressure of 2.0 bar, the temperature of the spray nozzle was 250° C., and the pressure of the spray nozzle was 400 psi. The annulus spray nozzle having the diameter of 0.5 mm and the area of $4.5\ e^{-5}\ m^2$ was used. The viscosity of the molten thermoplastic elastomer resin spray liquid was 2,000 cp at 250° C. The amount of the discharged thermoplastic elastomer resin was constant at approximately 0.5 kg/hr.

Example 2

The thermoplastic elastomer resin powder having the average particle diameter of 25 μm was produced by the melt ESD in the same manner as in Example 1 except that the pressure of the injected air was 3.0 bar.

Example 3

The thermoplastic elastomer resin powder having the average particle diameter of 15 μm was produced by the melt ESD in the same manner as in Example 1 except that the pressure of the injected air was 4.0 bar.

Example 4

The thermoplastic elastomer resin powder having the average particle diameter of 10 μm was produced by the melt ESD in the same manner as in Example 1 except that the pressure of the injected air was 5.0 bar.

Example 5

The thermoplastic elastomer resin powder having the average particle diameter of 8 μm was produced by the melt ESD in the same manner as in Example 1 except that the pressure of the injected air was 6.0 bar.

Example 6

The thermoplastic elastomer resin powder having the average particle diameter of 70 μm was produced in the same manner as in Example 1 except that montan wax was added at the content of 0.2 wt % in the melt spray deposition using the thermoplastic elastomer resin pellets.

Example 7

The thermoplastic elastomer resin powder having the average particle diameter of 90 μm was produced in the same manner as in Example 1 except that montan wax was added at the content of 0.4 wt % in the melt spray deposition using the thermoplastic elastomer resin pellets.

Example 8

The thermoplastic elastomer resin powder having the average particle diameter of 100 μm was produced in the same manner as in Example 1 except that montan wax was added at the content of 0.6 wt % in the melt spray deposition using the thermoplastic elastomer resin pellets.

Example 9

The thermoplastic elastomer resin powder having the average particle diameter of 70 μm was prepared in the same manner as in Example 1 except that montan wax was added at the content of 0.8 wt % in the melt spray deposition using the thermoplastic elastomer resin pellets.

Example 10

The pressure of the injected air was 4.0 bar, the annulus spray nozzle having the diameter of 1 mm and the area of $1.4\ e^{-4}\ m^2$ (about twice nozzle area) was used, and the amount of the discharged thermoplastic elastomer resin was constant at approximately 2 kg/hr. The thermoplastic elastomer resin powder having the average particle diameter of 200 μm was produced by the melt spray deposition in the same manner as in Example 1 except for the above conditions.

Comparative Example

The thermoplastic elastomer resin powder having the average particles size of 220 μm was produced by carrying out a cryogenic process at the temperature of approximately −200° C. on the same thermoplastic elastomer resin pellets as in Example 1.

Evaluation

Experimental Example 1

The SEM images of the thermoplastic elastomer resin powders prepared in Examples 1, 2, 4 and 5, and Comparative Example 1 were compared.

Figure 1:
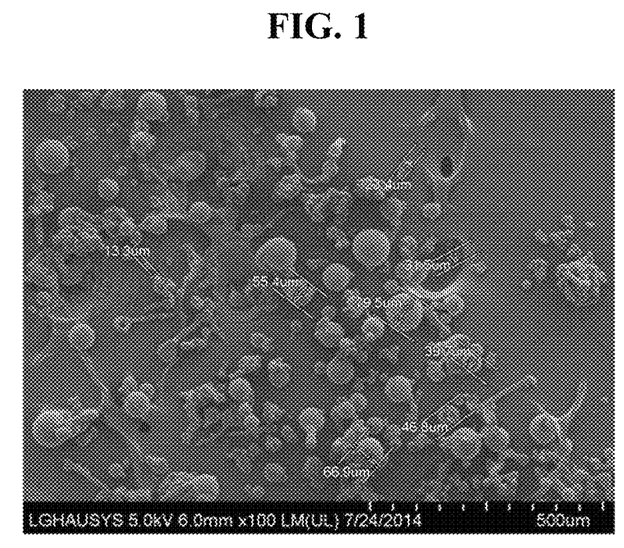
FIG. 1 is an SEM image of the thermoplastic elastomer resin powder produced in Example 1.
Figure 2:
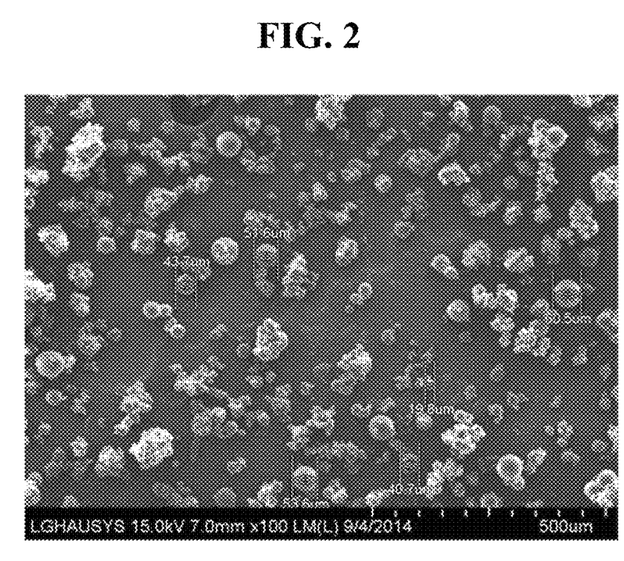
FIG. 2 is an SEM image of the thermoplastic elastomer resin powder produced in Example 2.
Figure 3:
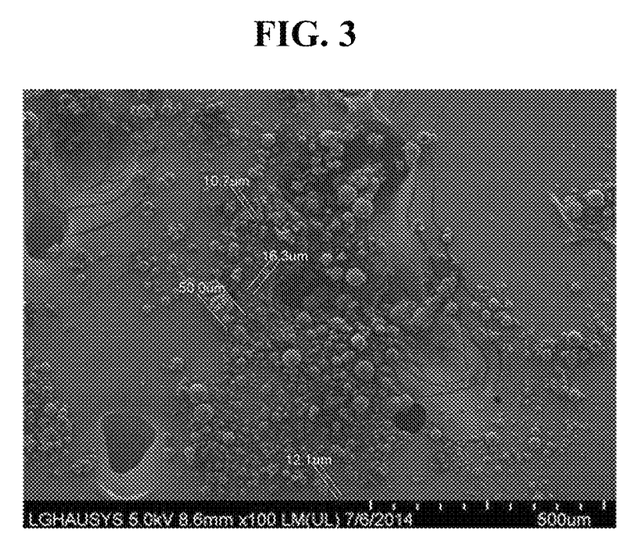
FIG. 3 is an SEM image of the thermoplastic elastomer resin powder produced in Example 4.
Figure 4:
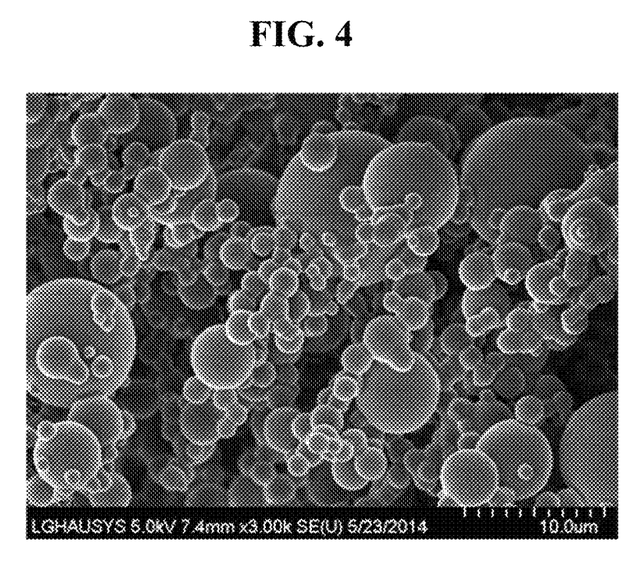
FIG. 4 is an SEM image of the thermoplastic elastomer resin powder produced in Example 5.
Figure 5:
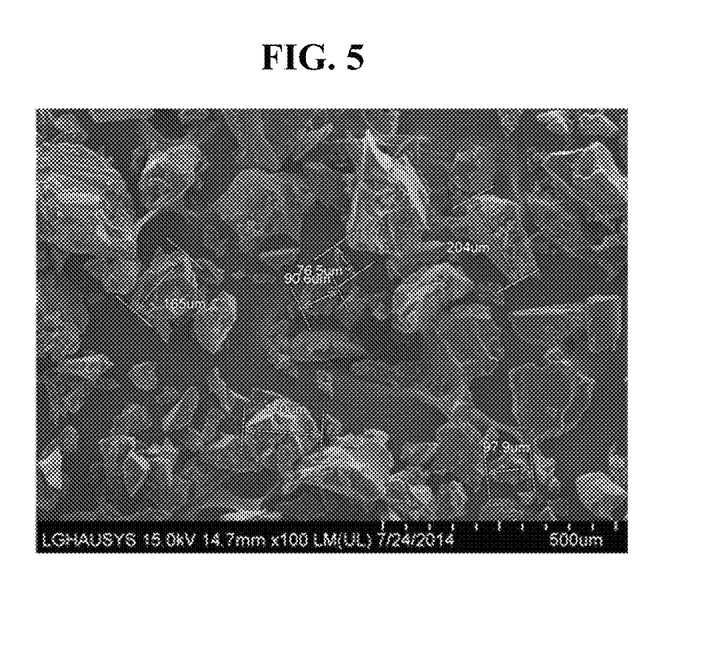
FIG. 5 is an SEM image of the thermoplastic elastomer resin powder produced in Comparative Example 1.

FIGS. 1 to 4 are SEM images of the thermoplastic elastomer resin powders in Examples 1, 2, 4 and 5, respectively, and FIG. 5 is an SEM image of the thermoplastic elastomer resin powders in Comparative Example 1. FIGS. 1 to 3 and 5 are SEM images at 100 times magnification, and FIG. 4 is an SEM image at 2,000 times magnification.

It can be seen that the particles have spherical shapes in FIGS. 1 to 4, whereas the particles are crushed into sharp shapes in FIG. 5.

Figure 6:
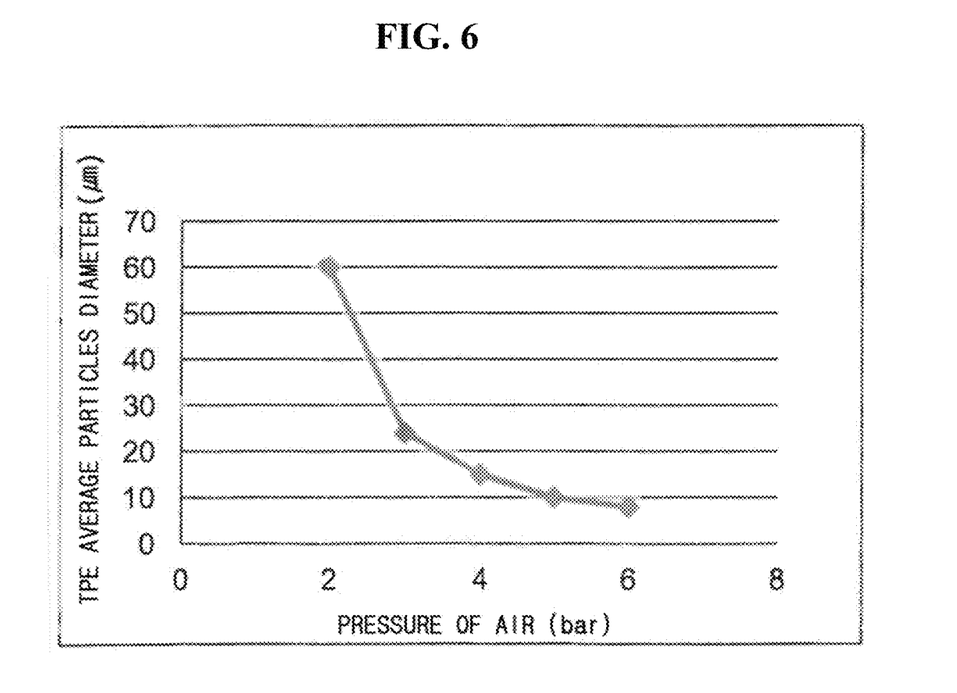
FIG. 6 is a graph showing the average particle diameters of the thermoplastic elastomer resin powders versus pressure of the injected air during the process of producing of the thermoplastic elastomer resin powders in Examples 1 to 5.

FIG. 6 is a graph showing the average particle diameters of the thermoplastic elastomer resin powders versus pressure of the injected air during the process of producing of the thermoplastic elastomer resin powders in Examples 1 to 5. In the graph shown in FIG. 6, the points correspond to Examples 1 to 5, respectively, from the left to the right.

Experimental Example 2

Figure 7:
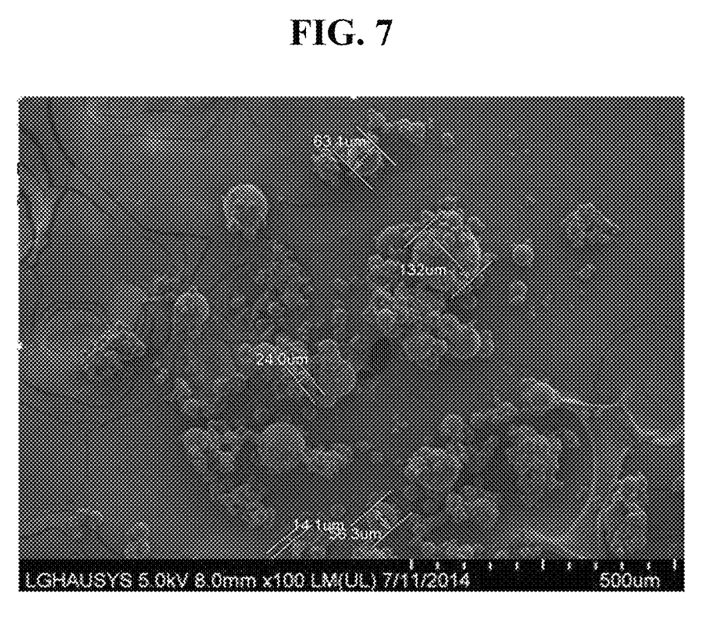
FIG. 7 is an SEM image of the thermoplastic elastomer resin powder produced in Example 1.
Figure 8:
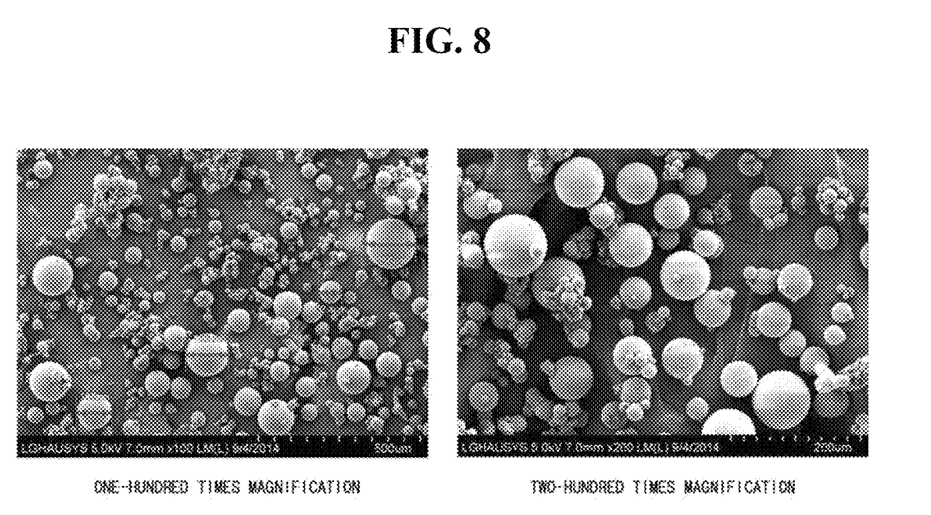
FIG. 8 is an SEM image of the thermoplastic elastomer resin powder produced in Example 7.

FIGS. 7 and 8 are SEM images of the thermoplastic elastomer resin powders produced in Examples 1 and 7, respectively, for comparison.

Figure 9:
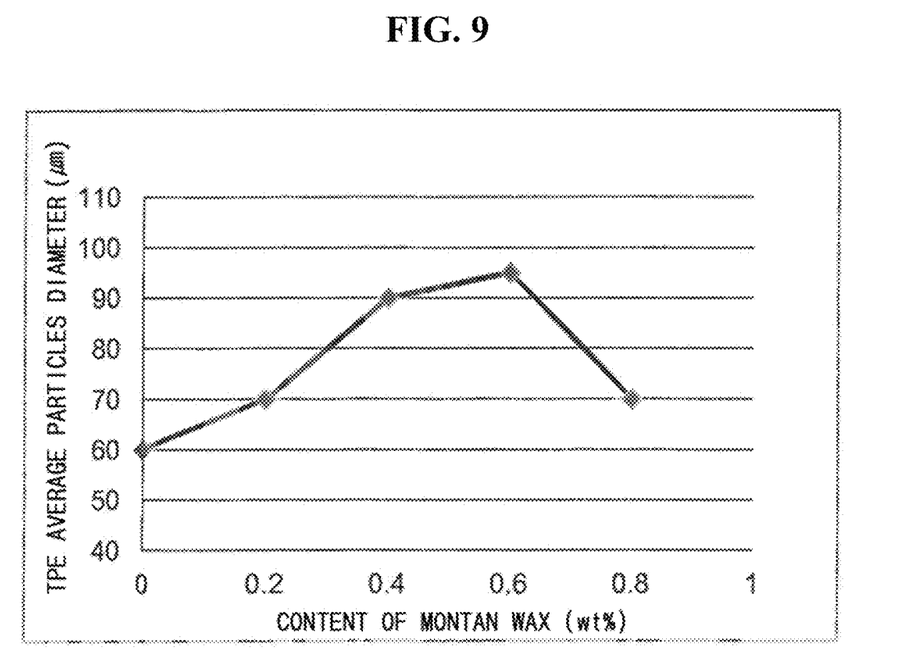
FIG. 9 is a graph showing the average particle diameters of the thermoplastic elastomer resin powders versus content of montan wax added during the process of producing the thermoplastic elastomer resin powders in Examples 1 and 7 to 10.

FIG. 9 is a graph showing the average particle diameters of the thermoplastic elastomer resin powders versus the content of montan wax added during the process of producing the thermoplastic elastomer resin powders in Examples 1 and 7 to 10. In the graph shown in FIG. 9, the points correspond to Examples 1 and 7 to 10, respectively, from the left to the right.

Figure 10:
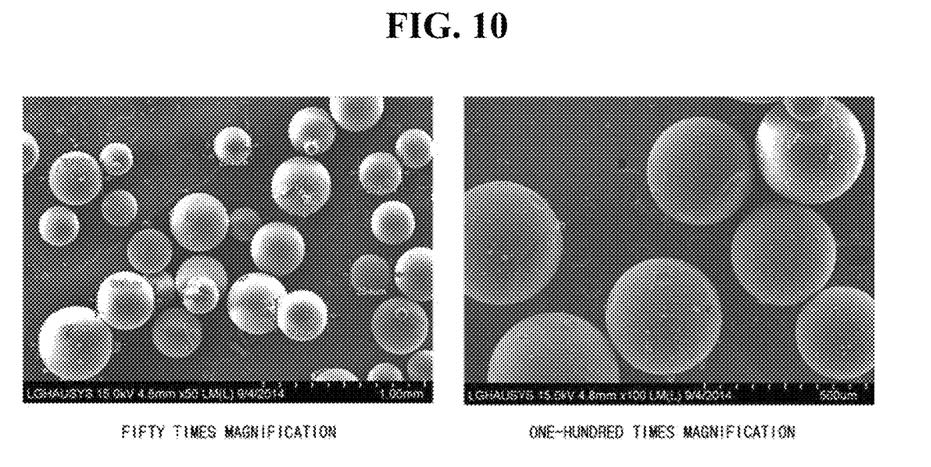
FIG. 10 is an SEM image of the thermoplastic elastomer resin powder produced in Example 10.

FIG. 10 is an SEM image of the thermoplastic elastomer resin powder produced in Example 10.

In the foregoing specification, the present disclosure has been described with reference to the specific exemplary embodiments. It will, however, be evident that various modifications and changes may be made therein without departing from the broader spirit and scope of the present disclosure invention as set forth in the appended claims.

The invention claimed is:

1. A thermoplastic elastomer (TPE) resin powder comprising:
   spherical particles of a thermoplastic elastomer resin, wherein
   an average particle diameter of the spherical particles ranges from 50 μm to 300 μm, and
   a weight-average molecular weight of the thermoplastic elastomer resin ranges from 10,000 to 20,000.

2. The thermoplastic elastomer resin powder according to claim 1, wherein the thermoplastic elastomer resin powder is used for forming in a powder slush molding process.

3. A method for producing the thermoplastic elastomer resin powder of claim 1, the method comprising:
   preparing a molten thermoplastic elastomer resin spray liquid; and
   spraying the molten thermoplastic elastomer resin spray liquid by a melt spray deposition while cooling it down simultaneously, to obtain a thermoplastic elastomer resin powder having spherical particles.

4. The method according to claim 3, wherein the thermoplastic elastomer resin is introduced into an extruder with an spray nozzle, and then transferred to the spray nozzle and heated in the spray nozzle to form the molten thermoplastic elastomer resin spray liquid.

5. The method according to claim 4, wherein the thermoplastic elastomer resin in a shape of a pellet or a pulverized particle powder is introduced into the extruder.

6. The method according to claim 4, wherein air is injected into the spray nozzle when the molten thermoplastic elastomer resin spray liquid is introduced into the spray nozzle.

7. The method according to claim 6, wherein a pressure of the air injected into the spray nozzle ranges from 20 to 145 psi.

8. The method according to claim 6, wherein a temperature of the air injected into the spray nozzle ranges from 150 to 500° C.

9. The method according to claim 6, wherein an injection rate of the air injected into the spray nozzle ranges from 10 to 70 m/s.

10. The method according to claim 3, wherein an additive comprising at least one selected from a group consisting of a lubricant, a plasticizer and a combination thereof is added to the molten thermoplastic elastomer resin spray liquid.

11. The method according to claim 10, wherein the additive is contained in the molten thermoplastic elastomer resin spray liquid at a content of 0.05 to 5 wt %.

12. The method according to claim 4, wherein a temperature of the spray nozzle ranges from 150 to 500° C.

13. The method according to claim 4, wherein a pressure of the spray nozzle ranges from 10 to 1,500 psi.

14. The method according to claim 3, wherein a viscosity of the molten thermoplastic elastomer resin spray liquid ranges from 1,000 to 10,000 cp at 250° C.

* * * * *